US010419242B1

(12) United States Patent
Tönsing et al.

(10) Patent No.: US 10,419,242 B1
(45) Date of Patent: *Sep. 17, 2019

(54) LOW-LEVEL PROGRAMMING LANGUAGE PLUGIN TO AUGMENT HIGH-LEVEL PROGRAMMING LANGUAGE SETUP OF AN SDN SWITCH

(71) Applicant: Netronome Systems, Inc., Santa Clara, CA (US)

(72) Inventors: Johann H. Tönsing, Los Gatos, CA (US); David George, Hilton (ZA)

(73) Assignee: Netronome Systems, Inc., Santa Clara, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 15/894,866

(22) Filed: Feb. 12, 2018

Related U.S. Application Data

(63) Continuation-in-part of application No. 15/173,653, filed on Jun. 4, 2016, now Pat. No. 9,891,898.

(60) Provisional application No. 62/171,230, filed on Jun. 4, 2015.

(51) Int. Cl.
*G06F 9/44* (2018.01)
*H04L 12/64* (2006.01)
*H04L 12/933* (2013.01)
*G06F 8/41* (2018.01)
*H04L 12/931* (2013.01)

(52) U.S. Cl.
CPC ............ *H04L 12/6418* (2013.01); *G06F 8/41* (2013.01); *H04L 49/10* (2013.01); *H04L 49/70* (2013.01)

(58) Field of Classification Search
CPC ..... H04L 12/6418; H04L 49/10; H04L 49/70; G06F 8/41
USPC ......................................................... 717/140
See application file for complete search history.

(56) References Cited

U.S. PATENT DOCUMENTS

| 2011/0320725 | A1* | 12/2011 | Dunn Berger | G06F 12/0811 711/127 |
| 2015/0181317 | A1* | 6/2015 | Yin | H04Q 11/0062 398/45 |
| 2015/0381324 | A1* | 12/2015 | Mirsky | H04L 1/24 370/241.1 |
| 2016/0057054 | A1* | 2/2016 | Lumezanu | H04L 45/48 370/256 |

(Continued)

*Primary Examiner* — Anna C Deng
(74) *Attorney, Agent, or Firm* — Imperium Patent Works LLP; T. Lester Wallace

(57) ABSTRACT

A method involves compiling a first amount of high-level programming language code (for example, P4) and a second amount of a low-level programming language code (for example, C) thereby obtaining a first amount of native code and a second amount of native code. The high-level programming language code at least in part defines how an SDN switch performs matching in a first condition. The low-level programming language code at least in part defines how the SDN switch performs matching in a second condition. The low-level code can be a type of plugin or patch for handling special packets. The amounts of native code are loaded into the SDN switch such that a first processor (for example, x86 of the host) executes the first amount of native code and such that a second processor (for example, ME of an NFP on the NIC) executes the second amount of native code.

19 Claims, 5 Drawing Sheets

COMPILATION PROCESS

(56) References Cited

U.S. PATENT DOCUMENTS

2016/0119255 A1* 4/2016 Luo ................... H04L 49/557
                                                                                     370/218
2016/0182380 A1* 6/2016 Mehra ................ H04L 47/125

* cited by examiner

DATA CENTER INVOLVING
SDN NODES

CODE DEVELOPMENT FOR AN SDN NODE

PROCESS FLOW OF THE PROGRAM CODE
FOR THE SDN NODE

COMPILATION PROCESS

INVOCATION OF LOW LEVEL LANGUAGE (LLL) PROGRAM
BY HIGH LEVEL LANGUAGE (HLL) PROGRAM

```
uint32_t get_ip_src_addr(void)
{
   return *(uint32_t *)0x23400;
}
```

THE AMOUNT OF LLL CODE 56 THAT IS OUTPUT
BY BLOCK 54 OF FIG. 4

```
the_addr = get_ip_src_addr();
```

THE LLL CODE OF PROGRAM 2 THAT CALLS THE
FUNCTION DEFINED BY THE CODE 56 OF FIG. 6

LOW-LEVEL PROGRAMMING LANGUAGE PLUGIN TO AUGMENT HIGH-LEVEL PROGRAMMING LANGUAGE SETUP OF AN SDN SWITCH

CROSS REFERENCE TO RELATED APPLICATIONS

This application is a continuation-in-part of, and claims priority under 35 U.S.C. § 120 from, nonprovisional U.S. patent application Ser. No. 15/173,653 entitled "Low-Level Programming Language Plugin To Augment High-Level Programming Language Setup Of An SDN Switch," filed on Jun. 4, 2016, which in turn claims priority under 35 U.S.C. § 119 from U.S. Provisional Application No. 62/171,230, entitled "Low-Level Programming Language Plugin to Augment High-Level Programming Language Setup of an SDN Switch," filed on Jun. 4, 2015. The subject matter of both of the above-identified applications is incorporated herein by reference.

TECHNICAL FIELD

The described embodiments relate generally to programmable SDN switches.

REFERENCE TO ASCII TEXT FILE APPENDIX

This application includes an ASCII text file appendix containing source code that embodies the inventions described herein. A portion of the disclosure of this patent document contains material that is subject to copyright protection. All the material in the ASCII text file appendix is hereby expressly incorporated by reference into the present application. The copyright owner of that material has no objection to the facsimile reproduction by anyone of the patent document or the patent disclosure (to the extent that the copyright is owned by the current assignee of this patent document), as it appears in the Patent and Trademark Office patent files or records, but otherwise reserves all copyright rights. The ASCII text file appendix includes the following text files that are readable in the MS-Windows operating system: 1) the file named "line_unwrapper.txt", is 1 KB large, created Feb. 12, 2018; 2) the file named "line_wrapper.txt", is 2 KB large, created Feb. 12, 2018; 3) the file named "nfp_pif_gen.txt", is 773 KB large, created Feb. 12, 2018; 4) the file named "p4_hlir.txt", is 384 KB large, created Feb. 12, 2018; 5) the file named "p42air.txt", is 175 KB large, created Feb. 12, 2018; and 6) the file named "single_filer.txt", is 2 KB large, created Feb. 12, 2018.

BACKGROUND INFORMATION

An SDN node is generally configured at configuration time, and then at run-time packet traffic is received into the SDN node via one of a number of input ports. The SDN node performs parsing of the packet, to identify various fields. The SDN node then matches against the fields to determine whether the packet matches a particular flow entry. From the matching flow entry, the SDN node then determines what action or actions to take. For example, the action may be to output the packet from a particular output port of the SDN node. Configuration at configuration time generally involves specifying how incoming packets will be parsed, how matching will be performed, and a set of actions that can be taken if a match is detected. For example, the OpenFlow 1.4.0 standard (as set forth by the Open Networking Foundation in "OpenFlow Switch Specification", version 1.4.0, Oct. 14, 2013, available from www.opennetworking.org) provides a predefined high-level structure for defining data path handling of a packet. Using OpenFlow commands, one or more match tables are set up in the SDN node, and the arrangement of those match tables is specified. In addition, OpenFlow commands are used to specify what the different possible actions are that might be indicated if a match occurs. Using other OpenFlow commands, the match tables can be populated with flow entries. In addition, at run-time once the SDN node is operating and is handling packet traffic, OpenFlow commands can also be communicated to the SDN node, thereby causing the SDN node to insert new flow entries into its match tables, or to delete flow entries from its match tables. The overall setup, and ways that the flow tables can be arranged, is specified by the OpenFlow standard.

The P4 programming language ("Programming Protocol-Independent Packet Processors" domain-specific language, as set forth by the P4 Language Consortium, at www.P4.org) is usable to provide an alternative to OpenFlow in that a user can use P4 language programming code to define, in a more flexible way, the data plane structure to be employed by the SDN node. For example, P4 is usable to set up a program-defined run-time data path, rather than just a table-based run-time data path as is used in OpenFlow. How the parsing of incoming packets is performed, and how and what the match tables are, and what the actions are and do is expressed in the P4 language. For example, P4 can be used to specify that a packet that matches in a particular way will be traffic-managed in a particular way and will be output from a particular output port of the SDN node. If P4 is employed, then the P4 code that sets up the data plane structure is compiled into native code. The native code is code that can be executed by the processor of the SDN node. The native code is loaded into the SDN node, and the processor then executes the code so as to realize the desired data plane packet handling structure.

SUMMARY

In a first novel aspect, a first amount of high-level programming language code and a second amount of a low-level programming language code is compiled thereby obtaining a first section of native code and a second section of native code. The first amount of high-level programming language code at least in part defines how an SDN switch performs a matching in a first condition. The second amount of low-level programming language code at least in part defines how the SDN switch performs matching in a second condition. The first section of native code is loaded into the SDN switch such that a first processor of the SDN switch can execute the first section of native code. The second section of native code is loaded into the SDN switch such that a second processor of the SDN switch can execute the second section of native code.

In one example, the SDN switch receives and processes packets such that first packets are matched in the SDN switch in accordance with a first matching specification defined by first native code that results from compiling the first amount of high-level programming language code. The SDN switch receives and processes packets such that first packets are matched in the SDN switch in accordance with a second matching specification defined by second native code that results from compiling the first amount of high-level programming language code.

In another example, a first part of the first native code that results from compiling the first amount of high-level programming language code is a part of the first section of native code that is loaded in the SDN switch such that a first processor of the SDN switch can execute the first section of native code. A second part of the first native code that results from compiling the first amount of high-level programming language code is a part of the second section of native code that is loaded in the SDN switch such that a second processor of the SDN switch can execute the second section of native code.

In yet another example, the high-level programming language code is P4 programming language code and the low-level programming language code is C programming language code.

In another example, the compiling occurs in the SDN switch. Alternatively, in another example the compiling does not occur in the SDN switch.

In another example, the first processor is an x86 host processor that executes a first instruction set and the second processor is a processor of a Network Flow Processor (NFP) that executes a second instruction set.

In a further example, the matching specified by the second amount of low-level programming language code cannot be specified using the high-level programming language.

In another example, the first section of native code is combined with the second section of native code into a single file. In one scenario the file is an Executable and Linkable Format (ELF) file.

In a second novel aspect, a first amount of high-level programming language code and a second amount of a low-level programming language code is compiled thereby obtaining a first section of native code and a second section of native code. The first amount of high-level programming language code at least in part defines how an SDN switch performs a first action, and wherein the second amount of low-level programming language code at least in part defines how the SDN switch performs a second action. The first section of native code is loaded into the SDN switch such that a first processor of the SDN switch can execute the first section of native code. The second section of native code is loaded into the SDN switch such that a second processor of the SDN switch can execute the second section of native code.

In one example, the first processor is an x86 host processor that executes a first instruction set, and wherein the second processor is a processor of a Network Flow Processor (NFP) that executes a second instruction set.

In another example, a third section of native code is obtained by the compiling of the first amount of high-level programming language code and the third section of native code is used during the compiling of the second amount of low-level programming language code.

Other embodiments and advantages are described in the detailed description below. This summary does not purport to define the invention. The invention is defined by the claims. Other structures and methods are described.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
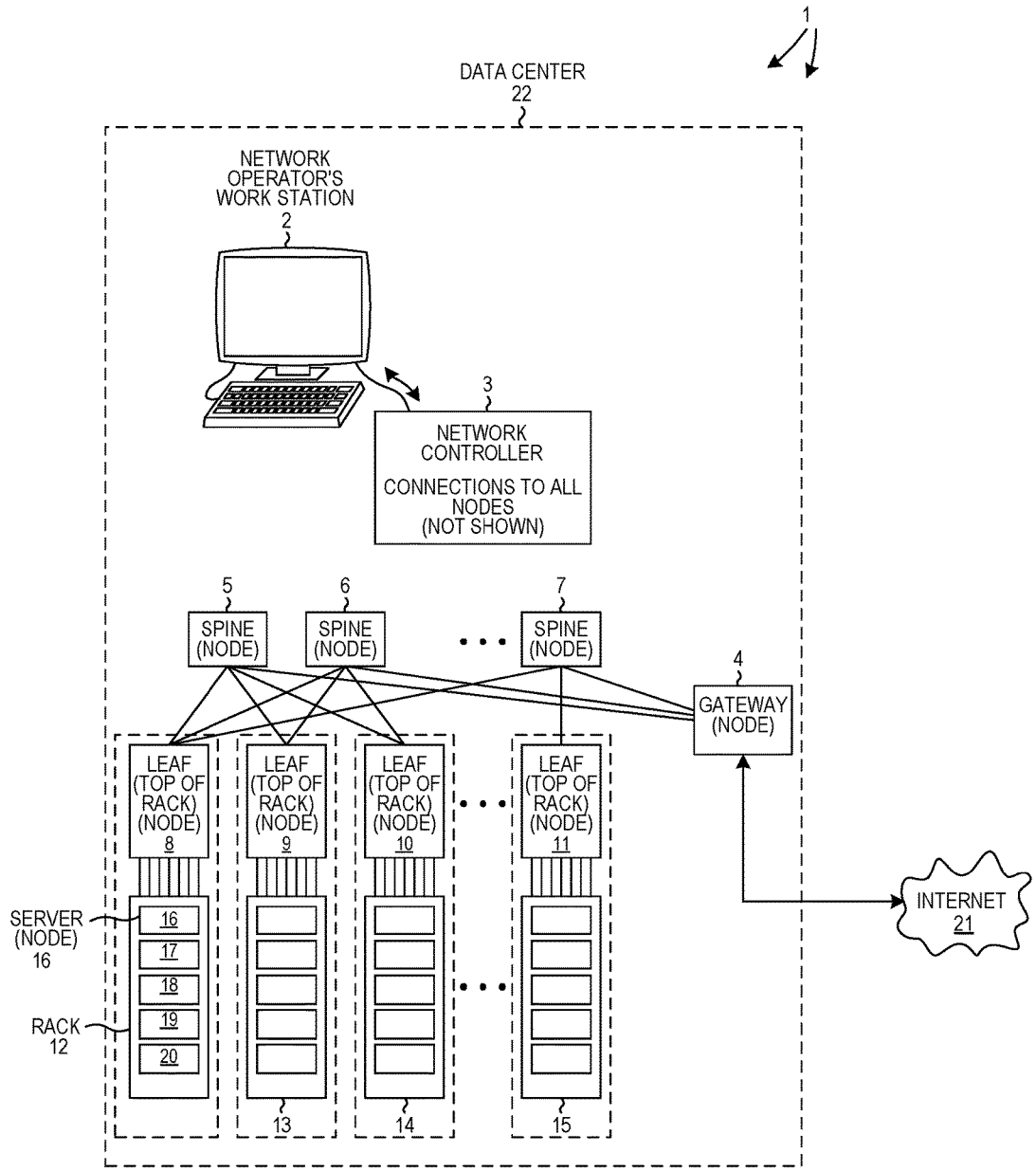
FIG. 1 is a diagram of a data center involving SDN nodes in accordance with one novel aspect.

FIG. 1 is a diagram of a system (in this example, a data center system) 1 that includes a network operator's work station 2, a network controller 3, a gateway node 4, a plurality of spine nodes 5-7, a plurality of leaf nodes 8-11, and several racks 12-15 of server nodes. Reference numerals 16-20 identify some of the server nodes. The nodes (or switches) are network switch appliances that are interconnected and that can intercommunicate packets between them. Each receives packets and output packets. In one example, a packet received from the internet 21 is received by the gateway node 4. The gateway node 4 adds a tag or otherwise encapsulates the packet so that the packet can be forwarded between the various nodes of the system using the tag or encapsulating information. In this way, the packet may be forwarded from the gateway node, through a spine node, to the leaf node, and to a destination server node. The server node may then examine the packet, and then output the packet, or another a packet. In one example, the packet in modified form passes from the server node, back through various other nodes, and back to the gateway node. The gateway node determines that the packet is to be output to the internet, so the gateway node strips off the tag, and outputs the packet to the internet. Each node in this example is a Software Defined Networking (SDN) switch appliance within a data center 22. The SDN node is configured and controlled by the central network controller 3. In one example, the OpenFlow protocol is used by the network controller 3 to set up and provision flow entries into the OpenFlow flow tables in the various nodes. In another example, the operation of the nodes is not setup and controlled using OpenFlow, but rather how the nodes perform parsing, matching and actions is setup and specified in another way. Regardless of the data plane parsing, matching and actions of the nodes are setup, the network controller 3 at run-time can modify and add and delete match specifications and action specifications as the node operates.

Figure 2:
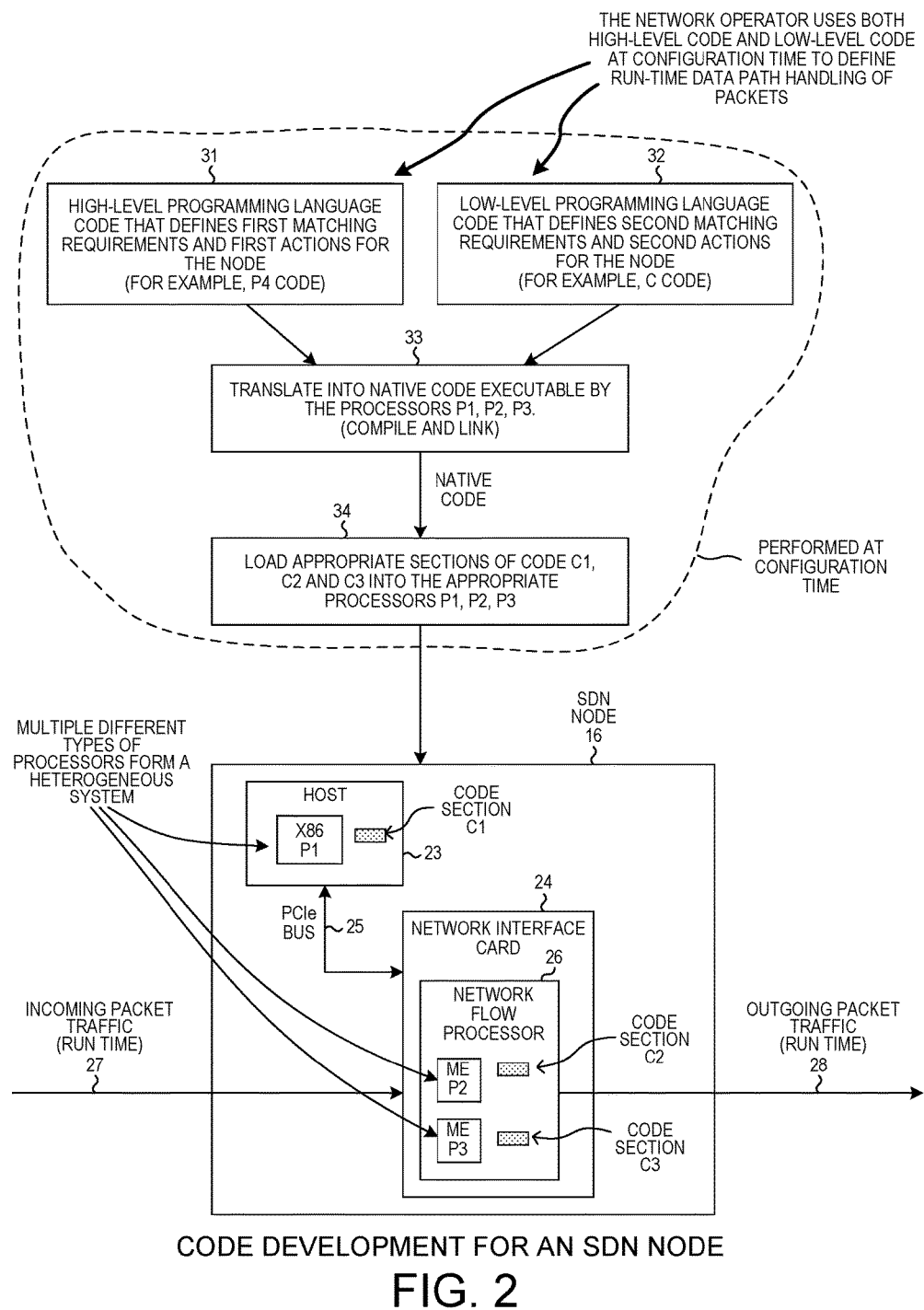
FIG. 2 is a diagram that shows how a program 30 involving both an amount of high-level programming code and an amount of low-level programming code are compiled, in order to generate multiple sections of native code, where at least a first section of the native code is loaded onto a first processor of a first type, and a second section of the native code is loaded onto a second processor of a second type, and where execution of the first and second sections of native code by the first and second processors together sets up and configures a data plane of an SDN switch.

FIG. 2 is a more detailed diagram of one of the nodes of FIG. 1 in accordance with one novel aspect. In this particular example, the node is one of the servers, server 16. The node 16 includes a host computer motherboard 23, and an expansion Network Interface Card (NIC) card 24. The host computer and the NIC intercommunicate using a PCIe bus 25. The host computer 23 includes a first processor P1 that is of a first type. In the present example, processor P1 is an x86-architecture processor. The NIC card 24 includes a Network Flow Processor (NFP) integrated circuit 26. The NFP 26 in turn includes multiple processors of a second type. In the present example, processor P2 and processor P3 are MicroEngine (ME) architecture processors. The processors of the first and second sets differ in multiple ways. One way they differ is that they execute native instructions of different instruction sets. During run-time, packets are received onto the node 16 as indicated by arrow 27. The NIC performs parsing on the incoming packets, and attempts to match in accordance with matching specifications. If a packet is determined to be match, then the NFP 26 performs an associated defined action or actions. In one example, if a match is detected, then the flow entry identified by the match specifies an indicator of an action. The indicated action is to output the packet from a specific output port of the NFP. Arrow 28 in the diagram illustrates the output packet traffic from SDN node 16. Although not illustrated, the NIC 24 typically has many different input ports via which packets are received, has many different output ports out of which packets can be transmitted. Under some conditions, for example if a packet is received but a match is not detected, then the NFP may forward the packet across PCIe bus 25 to the host computer. The processor P1 of the host computer then executes code and analyzes the packet. As a result of execution of this code, the processor P1 determines an action to take. The action may, for example, be to return the packet to the NFP and to instruct the NFP to output the packet in a particular way from a particular output port.

In accordance with one novel method, a program 30 includes a first amount of programming code 31 and a second amount of programming code 32. The first amount of programming code 31 is written in a high-level programming language. The first amount of code defines first matching requirements and first actions for the SDN node. In the present example, the high-level programming language is the P4 programming language. The second amount of programming code 32 is written in a low-level programming language. The second amount of programming code defines second matching requirements and/or second actions for the node. In the present example, the low-level programming language is the C programming language. In one example, these two amounts 31 and 32 of code are written by the network operator using work station 2.

Next, the two amounts 31 and 32 of code are "translated" 33 into native code. Translation, as the term is used here, means compiling and linking as necessary so that an appropriate section of native code is generated for each of the processors P1, P2 and P3. The code for each processor is in the native code that is executable by that processor. Together the various processors, each executing its own section of native code, carry out of the overall data plane handling of packet traffic, as set up by the network operator. In the illustrated example, code section C1 is native code for execution by the P1 processor, the code section C2 is native code for execution by the P2 processor, and the code section C3 is native code for execution by the P3 processor.

Next, each of the sections C1, C2 and C3 of native code is loaded 34 into the appropriation processor. C1 is loaded into the host computer so that it can be executed by the host CPU P1. C2 is loaded in the NFP of the NIC, so that the MicroEngine processor P2 can execute that code. C3 is loaded in the NFP of the NIC, so that the MicroEngine processor P3 can execute that code. This setting up and configuring of the SDN node 16 to have a desired data plane is performed at configuration time of the node. After configuration time, the SDN node 16 is then operated at run-time. During the run-time the SDN node 16 handles packet traffic using the setup data plane.

Figure 3:
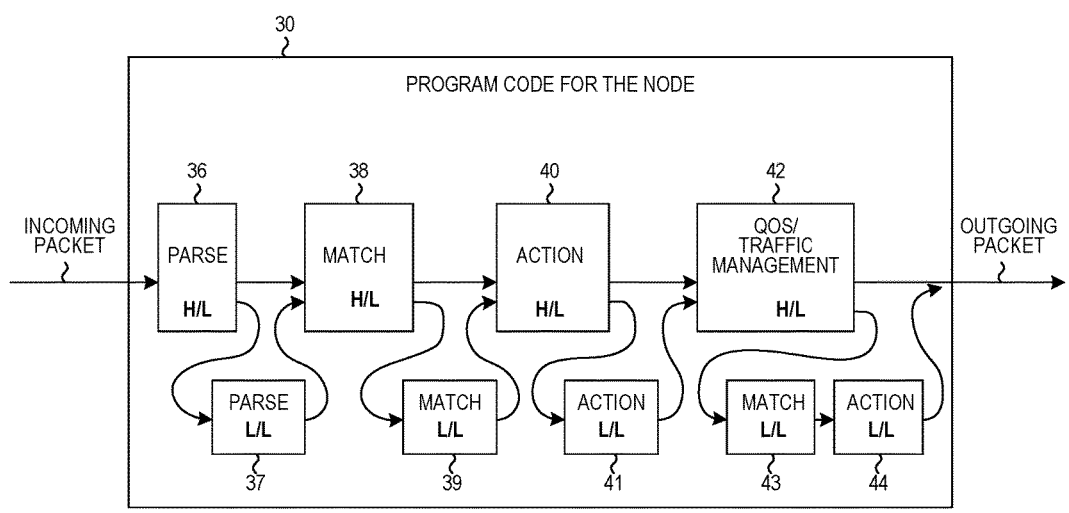
FIG. 3 is an illustration of process flow through the SDN switch when the SDN switch is setup and configured to carry out the data plane as specified by the program 30.

FIG. 3 is a diagram of the structure of the overall program 30. The notation "H/L" in a block denotes that the function performed by that particular block is defined by the first amount of code 31 that is written in the high-level programming language. The notation "L/L" in a block denotes that the function performed by that particular block is defined by the second amount of code 32 that is written in the low-level programming language. A first parsing operation 36 is defined and specified by the high-level language code. For example, the P4 language can be used to specify that after all MAC headers, that a next IP header may be detected, and if it is detected it would be of a certain number of bytes, and would have a particular format. If that specific type of IP header is detected by the H/L parse operation 36, then that header should be supplied to the match function. In addition, a second parsing operation 37 is defined and specified by the low-level programming language code. For example, the C programming language can be used to specify that after all MAC headers, that a next user-defined header may be detected, and if it is it would be of a certain number of bytes, and would have a particular format. If that special user-defined header is detected by the L/L parse operation, then that special user-defined header should be supplied to the match function.

A first match operation 38 is defined and specified by the high-level programming language code. For example, the P4 language can be used to specify an arrangement of match tables, and to specify which values as output by the parse operation are to be matched against which match values, and in which order the matching is to occur. In addition, a second match operation 39 is defined and specified by the low-level programming language code. For example, the C programming language can be used to specify an analysis or test to be performed on various portions of the packet as output by the parser operations, where the result of the analysis or test is then supplied to the action function. As compared to the P4 programming language, the C programming language is a lower-level, and more powerful, language that can operate on any arbitrary part of a parsed field or payload, including parts of the data of the payload, and that can make decisions based on stored state, and that can implement multi-level decision trees, and that can utilize bit-wise Boolean, arithmetic operations, and complex logic tests at the bit level. In one example, if either the H/L match operation 38 detects a match or if the L/L match operation detects a match 39, then an indication of the detected match is supplied to the action operation. The software of the program 30 is flexible and can be written such that in some cases of execution of the resulting native code only matching as defined by the high-level programming language is performed, whereas in other cases of execution the result of high-level programming language defined matching in turn causes low-level programming language defined matching to be initiated. Alternatively, the software of the program 30 can be written so that each of the high-level programming language defined matching block 38 and the low-level programming language defined matching block 39 output a true or false indications. Only if both output true (indications that both blocks 38 and 39 returned a "match" detection) is the associated action condition (as defined by one or the other of blocks 40 and 41) initiated.

A first action operation 40 is defined and specified by the high-level language code. For example, the high-level language can setup and specify that if a match in a particular match table occurs, then a predefined action to output the packet from a particular NIC output port is the action. A second action operation 41 is defined and specified by the amount of low-level programming code. The C programming language may, for example, be used to set up flexible and powerful bit-wise complex modifications of various parts of the incoming packet in order to generate an output packet, where the type of packet is not a conventional packet and where the modification to be done is not done in the handling of packets of any conventional protocol. The second action of action operation 41 may be an action to perform further actions and manipulations in addition to actions and modifications that are indicated to be done by the high-level programming language defined action of operation block 40. The second action operation may also perform actions and manipulations that are performed in conditions in which no actions are indicated to be taken by the high-level operation block 40.

A first QOS/TM operation 42 is defined and specified by the high-level programming language code. This code defines egress processing, for example including egress modification and QoS (Quality Of Service) and traffic management handling. A second egress operation 43 and 44 is defined and specified by the low-level code. In the present example, if the egress packet meets certain match criteria as determined by operation 43, then a specific action is taken where the action as defined by operation 44 is egress handling of the packet so as to fine tune traffic management.

In one example, the handling of packets specified by the high-level language code implement a data plane as would be found in an OpenFlow switch where only packets of conventional protocols are handled by the NFP on the NIC, and packets having unconventional or unrecognized formats must be forwarded from the NIC to the host CPU. The amount of low-level programming language code, however, is a type of plugin or patch that allows the SDN 16 node to recognize and handle special packets that employ a fully user-defined protocol employing customized headers. The user-defined protocol may be a layer 2 protocol, or a layer 3 protocol, or a layer 4 protocol. Switch operation in accordance with the special user-defined protocol can require fine-granularity bit-wise manipulation and the use of complex logic decision trees, and logical decision making employing conditional logic equations and expressions, and may use stored state information, where these manipulations and decisions are not possible using only the conventional high-level programming language P4 to setup and configure the SDN node 16. In one example, the network operator of the data center uses the high-level programming language P4 to setup and define and configure the nodes of the data center 22 to perform a custom type of tunneling, where specials headers are employed in this tunneling scheme that are not understood by nefarious entities who attempt to listen in or snoop on communications within the data center without the network operator's authorization. The low-level programming language code is used to set up and configure the nodes to handle details of the protocol, for example to detect and to block attacks in special circumstances, and to then take special actions. The native code compiled from low-level programming language code, when triggered on the node, can operate on parts of the data payload and can cause complex bit-wise actions and logical tests to be performed in a way that cannot be specified by the high-level programming language.

In a second embodiment, the amount of high-level programming language code 31 is not provided to setup the first matching requirements and first actions, but the SDN node 16 is OpenFlow compliant and implements an OpenFlow data path flow table scheme for defining the arrangement of flow tables and how matching is done. According to OpenFlow, certain header fields are to be matched against certain flow tables, where the flow tables have flow entries to be supplied at run-time. The amount of low-level programming language code 32 is, however provided. This amount of low-level programming language code 32 may, for example, define a special specific action. As a result of translation and loading into the node, an action table has a flow entry, where the action value of the flow entry is associated with an amount of native code. The native code is code that was generated by compiling the amount of low-level programming code. In one example, this native code is loaded into the NFP or the NIC. At run time a packet is received onto the NIC. The NFP performs parsing and matching as set up according to OpenFlow rules, but the packet is found to match the flow entry whose action indicates the amount of native code. As a result, one of the processors P2 or P3 executes the amount of native code. Due to the use of the low-level programming language, the action can be an action that cannot be performed by the SDN node if the SDN node is simply operated as a conventional OpenFlow switch. The action may be a complex fine granularity action that the hardware egress circuitry of the NFP is not predesigned to perform. Using the low-level programming language plugin aspect and feature of the present invention, however, a complex egress operation can be specified in the low-level programming language so that it can then be performed in software (due to execution of the resulting native code by a processor on the NFP).

Figure 4:
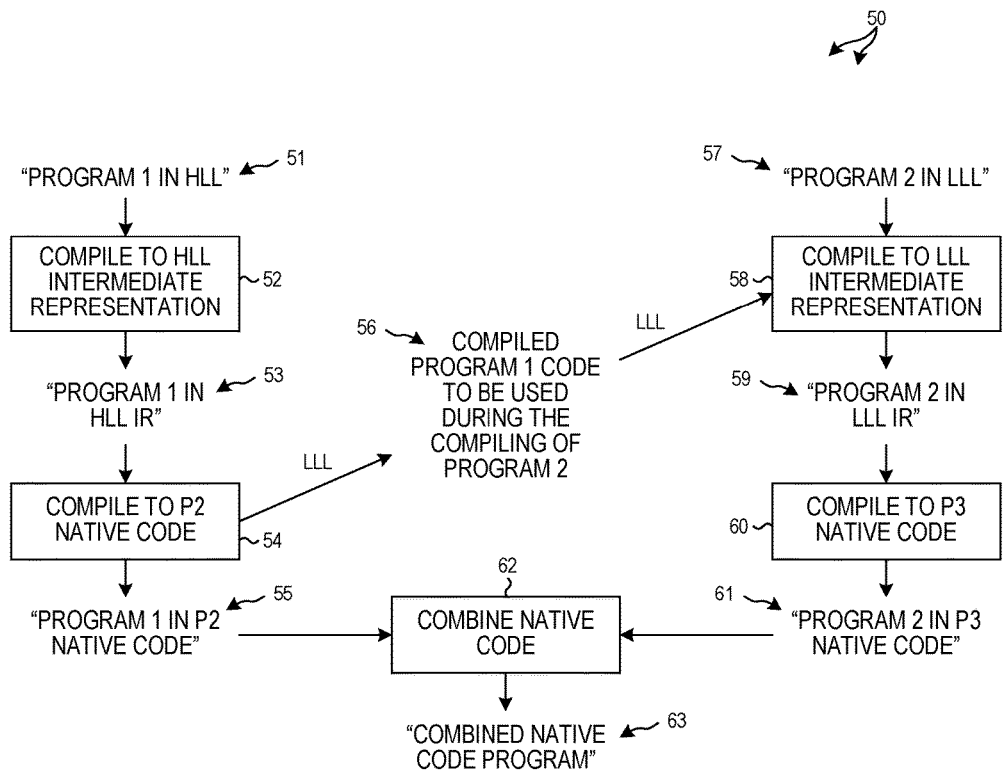
FIG. 4 is an illustration of a compilation process to create a combined native code program.

A compilation process and method 50 usable to create a combined native code program 63 is illustrated in FIG. 4. The combined native code program 63 is composed of program 1 and program 2, where program 1 is expressed in a high-level language (HLL), for example P4, and where program 2 is expressed in a low-level language (LLL), for example C. Steps 52-62 are performed to create the combined native code program for a target processor. In one example, the target processor is processor P2 shown in FIG. 2. In another example, the target processor is processor P3 shown in FIG. 2.

Program 1 may invoke a certain part of program 2 at a certain stage of the execution of program 1, for example in the case of program 1 expressing the behavior of a network switch, program 2 may be invoked to perform matching (classification) of network packets, modification of network packets, e.g. field modification or encapsulation/decapsulation (actions). In these cases, execution of program 1 will continue after the relevant part of program 2 has executed.

Another option is for program 1 to complete processing of a data item (for example a packet in the case of a network switch), with the data item being subsequently passed to program 2 for processing. As this is tantamount to the portion of program 1 executing after program 1 being empty, it is not explicitly covered here.

The following description covers compiling the programs to native code for processors P2 and P3, where P2 is a core on a multi-core processor chip, and P3 is another core on the same multi-core chip. The following description further covers where P2 and P3 are the same type of processor (for example microengines—MEs—on a Network Flow Processor), as depicted in FIG. 2.

The case where the two processors are cores located on different chips, or are different types of processors (for example where they are actually P1 and P2 in FIG. 2), while not explicitly covered by this description, follows analogously.

In all cases, the processors need to be able to exchange data being processed (e.g. packets) by sending the data back and forth over a communication channel and/or by depositing the data in memory accessible to both of the processors.

The result of compilation is in the case being described a single file combining the result of compilation for both processors.

Where the processors are located in different chips, the final combining (linking) step may be omitted, resulting in two different files to be executed on the two processors.

In step 52, Program 1 in HLL code 51 is received into the compiler. Program 1 in HLL code 51 is compiled into program 1 in HLL intermediate representation (IR) 53, where program 1 in HLL IR 53 expresses the semantics (behavior) of the program by using a standardized syntax, for example a text based syntax like JSON, YAML or XML, or where the IR expresses the semantics of the program using data structures in the memory of the compiler, for example an abstract syntax tree. The program 1 in HLL IR 53 does not represent the original textual representation of the program 1 (i.e. its syntax) as-is; for example, comments are removed and alternative representations of the same required behavior (semantics) may be transformed into a single representation. It does however contain sufficient information to unambiguously and accurately reflect the desired behavior that was expressed in the original program.

In step 54, program 1 in HLL IR 53 is compiled into P2 native code 55. The compiler first performs lexical analysis of the input program 1 in HLL IR (stream of text), whereupon the resulting set of tokens is processed by a parser, yielding an abstract syntax tree. This can be emitted to the IR as-is, or optimizations which simplify and speed up subsequent execution of the program without affecting the semantics of the program can be invoked at this stage. Constructing a suitable compiler is simplified using commercial or open source lexical analysis and parsing toolkits. A ready-made compiler (obtained from a commercial vendor or open source project) may of course alternatively be obtained. For the case of the HLL being the P4 language, such a compiler is available at the www.P4.org web site, from which you can download a P4 compiler and load it on to a computer system, such as the network operator's work station 2 shown in FIG. 1. The P4 compiler can then be executed on the computer system.

After completion of step 54, program 1 in HLL IR is now compiled and transformed into program 1 in native code 55 for P2, either by directly transforming the program 1 HLL IR 53 to native binary code, or by transforming it to a lower level text based language (for example assembler or C) and subsequently invoking a compiler/assembler with the ability to take as input the lower level language to produce the native binary code.

In step 58, Program 2 in LLL native code 57 is compiled into program 2 in LLL intermediate representation (IR) 59, where program 2 in LLL IR 59 expresses the semantics (behavior) of the program by using a standardized syntax, for example a text based syntax like JSON, YAML or XML, or where the IR expresses the semantics of the program using data structures in the memory of the compiler, for example an abstract syntax tree. The program 2 in LLL IR 59 does not represent the original textual representation of the program 2 (i.e. its syntax) as-is; for example, comments are removed and alternative representations of the same required behavior (semantics) may be transformed into a single representation. It does however contain sufficient information to unambiguously and accurately reflect the desired behavior that was expressed in the original program.

In one embodiment, "Program 2 in LLL" 57 is compiled along with compiled program 1 code 56 created during step 54. In this embodiment, the program 2 in LLL IR utilizes information gathered during the compiling of program 1 in HLL. For example, program 1 may determine that packets being parsed are ethernet packets and for each ethernet packet determine an ethernet source address, ethernet destination address and an ethernet type. In the event that program 2 requires ethernet source address, ethernet destination address or ethernet type information, program 2 can attain the ethernet information determined during the compiling process of program 1, thereby avoiding the need to repeat the determination of the same ethernet information during the compiling of program 2.

In step 60, "Program 2 in LLL IR" code 59 is compiled into P3 native code 61. The compiler first performs lexical analysis of the input program 2 in LLL IR (stream of text), whereupon the resulting set of tokens is processed by a parser, yielding an abstract syntax tree. This can be emitted to the IR as-is, or optimizations which simplify and speed up subsequent execution of the program without affecting the semantics of the program can be invoked at this stage. Constructing a suitable compiler is simplified using commercial or open source lexical analysis and parsing toolkits. A ready-made compiler (obtained from a commercial vendor or open source project) may of course alternatively be obtained. For the case of the LLL being the C code, such a compiler is readily available.

After completion of step 60, "Program 2 in LLL IR" code is now compiled and transformed to "Program 2 in native code for P3" code 61, either by directly transforming the program 2 LLL IR to native binary code, or by transforming it to a lower level text based language (for example assembler or C) and subsequently invoking a compiler/assembler with the ability to take as input the lower level language to produce the native binary code.

In step 62, "Program 1 in P2 native code" 55 is combined with "Program 2 in P3 native code" 61. The "Combined native code program" 63 is then programmed into processors P2 and P3. In one example, the combined file includes the code for the P2 processor is stored in one section of the combined file and the code for the P3 processor stored in another section of the combined file. Each section within the combined file identifies the process to which the code in the section belongs. This is may be identified by storing the applicable processor number in each section of the combined file. This enables the loader to write the code image from the appropriate section of the combined file into the correct processor's code storage. A combined file may be an Executable and Linkable Format (ELF).

"Program 1 in P2 native code" 55 needs to be directly executable on P2. For the case of the HLL being the P4 language, the program will for example amongst others express packet parsing and matching operations, as well as actions that need to be performed when packets match configured rules. Actions may include forwarding or dropping (discarding) packets, or may require packet modification, for example changing header fields or encapsulation/decapsulation.

For P4 HLL, packet parsing is transformed to native code by emitting native code instructions that read packet data from the memory where packets are stored (on-chip or off-chip memory), and examining the data to decode the outermost header into packet field variables (typically stored in on-chip memory). Depending on the values of the fields that identify which higher layer protocol is embedded in the outer header, a contained header may also be read and decoded into individual fields, with the process being repeated until all fields to which the P4 program refers having been decoded.

Additionally for P4 HLL, packet matching is transformed to native code by generating matching code customized to the specific fields being matched (e.g. the code may vary according to the field width and the number of fields) as well as the desired matching semantics (e.g. an exact match may be transformed to a hash table lookup whereas a longest prefix match may be implemented using a trie match algorithm). The generated code may invoke existing libraries or macros that are independent of the programs being compiled. In this case, the native code is composed of a mixture of emitted code and references to the existing code. In the case of more complicated matching, covering multiple fields to be matched against a set of rules in priority order, with the option of wildcards in each field, a more complex matching algorithm such as an algorithmic TCAM implementation or the well known DCFL algorithm may be employed. These more complex matching algorithms are typically implemented in such libraries.

Further for P4 HLL, actions are transformed to native code by generating equivalent operations expressed in the native instruction set, for example a set field action will be transformed into an action that directly rewrites the field in the memory associated with the packet, or it may update the extracted field value and cause the field to be subsequently written back to the packet to modify the packet, using a flag (typically called a dirty flag) to indicate that this is required.

Moreover for P4 HLL, quality of service is implemented by the P4 program having the ability to specify the queue/scheduler/shaper/meter to be employed, together with appropriate parameters. The actual QoS operations are implemented in existing native code libraries or by hardware components.

Figures 5, 6, 7:
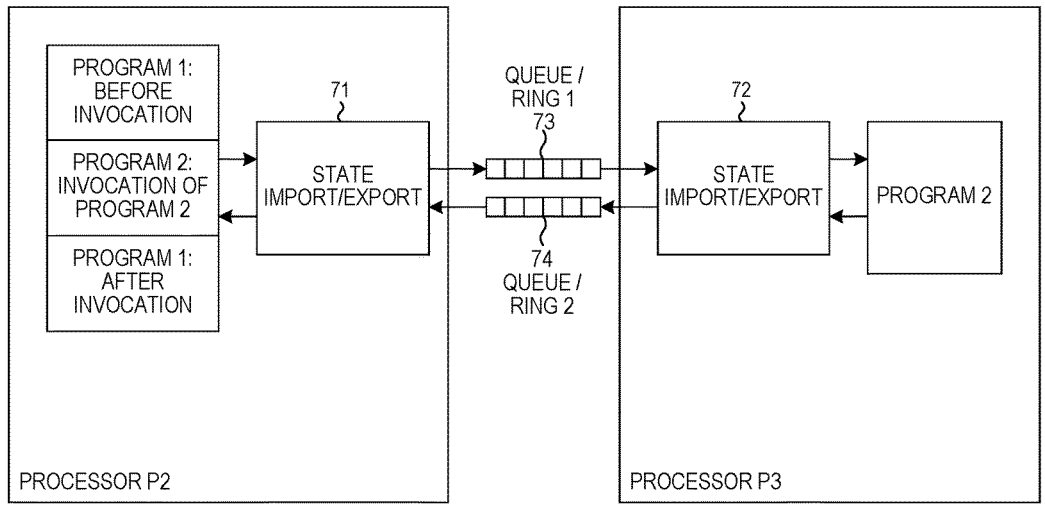
FIG. 5 is an illustration of an invocation of a Low-Level Language (LLL) program by a High-Level Language (HLL) program.
FIG. 6 is a diagram of code that defines a function, where this function is usable to provide access to the data generated during execution of the first amount of native code 55 of FIG. 4.
FIG. 7 is a diagram that sets forth a function call that is usable to call the function defined by the code of FIG. 6.

FIG. 5 illustrates an invocation of a Low-Level Language (LLL) program by a High-Level Language (HLL) program. Program 1 in the HLL IR may contain an invocation of functionality expressed in program 2 in LLL. In this case, the compilation of operations prior to the invocation proceeds as described above regarding FIG. 4.

The compilation of the invocation of program 2 by program 1 entails making the data being processed by the program (e.g. a packet, in the case of a network switch) available to the processor executing program 2, together with any additional data (e.g. state) required for executing the program.

In the present embodiment, processors P2 and P3 share memory, but are not the same core. Some of the data (e.g. the packet data and some of the associated metadata) may be exchanged by writing it to memory shared by both processors (either on-chip memory like CTM/IMEM/EMEM or off-chip memory like DRAM in the case of the Network Flow Processor), with other data (e.g. further associated metadata, as well as the notification that invocation is required) being transported over a queue (in on-chip or off-chip memory) to/from the second processor. The emitted native code will invoke the required primitives or library functions to effect this operation. This code is referred to as the "State Import/Export" code 71 and 72 in FIG. 5. For more information regarding a Network Flow Processor including processors with off-chip memories, see U.S. patent application Ser. No. 13/399,888, entitled "Island-Based Network Flow Processor Integrated Circuit", filed on Feb. 17, 2012, now U.S. Pat. No. 9,237,095 (the entire subject matter of which is incorporated herein by reference).

Where the processors do not share memory, all the required data needs to be exported into a message which is transported over a queue (implemented for example via a bus like PCI Express) between the processors. The emitted native code will invoke the required primitives or library functions to effect this operation.

In the case of the two processors being the same core on the same chip, the emitted native code can directly cause program 2 to be invoked from program 1, by issuing a function or subroutine call, or by emitting program 2's native code in line. In this case, the queues 73 and 74 depicted in FIG. 5 are not required.

Data conversion may be required to enable program 2 to access the data being operated on as well as access the associated state. This data conversion may for example involve data type conversion (e.g. conversion between different widths of integers or conversion between integers and strings) and data representation conversion (e.g. endianness conversion). The data conversion is performed by processor P2 or processor P3, or by a combination of the processors, with an intermediate data format being employed.

Moving the data between memories and other memories (e.g. local memory and shared memory) as well as between memories and queues is effected by generating appropriate native code combined with invocations of library functions that perform these tasks.

The code that needs to be executed on processor P3 to perform these data conversion and movement operations is emitted as LLL (e.g. C) code by the compilation process. This code is referred to as the "compiled program 1 code to be used during the compiling of program 2" in FIG. 4.

For each header field parsed by the P4 code in Program 1, this code would for example contain a C accessor function/macro, or a structure type declaration by which the fields in a header can be accessed. Packet metadata (e.g. the ingress/egress port or the timestamp) would be similarly represented and accessed.

The results of matching (which entries matched and which actions they are associated with) as well as QoS related information (e.g. the queue and forwarding class to be employed for a given packet) are similarly represented.

Once the LLL code has completed executing for a given item of data being processed (e.g. packet), information is transformed in the other direction, to enable the HLL program to continue processing. The result of matching operations performed by the LLL code may for example be made available to the HLL program as metadata which can be matched (along with metadata previously computed by the HLL code and information contained in the data being processed itself, e.g. packet fields) in order to further influence the matching process. Alternatively the LLL code can directly supply to the HLL code the actions to be executed or the QoS queues/parameters to be used.

In this way, the LLL (e.g. C) code can interface to and integrate with native code emitted by the HLL (e.g. P4) compiler.

The compilation of the LLL (e.g. C) entails the compilation of Program 2, supplied by the author of Program 2 in a set of text files, combined with the compilation of the LLL Code to Interface to Program 1.

Compilation of the LLL (e.g. C) to native code is not described in detail here, as this proceeds analogously to compilation of HLL code as described above. Furthermore this process is well known to any programmer skilled in the art of compiler construction, and a multitude of existing compilers (commercial and open source, for example GCC and LLVM CLANG) are readily available. The result of the compilation of LLL code to native code is native binary code executable on processor P3.

In one embodiment, emitted native binary code for processor P2 and processor P3 is linked together along with any required dependencies (e.g. initialization code or libraries containing functions to which the code refers), resulting in a single complete executable (binary) file containing all the native code.

Such linking entails combining the binary code resulting from the aforementioned compilation processes with binary code obtained from libraries and standard initialization code known to the linker. The combining process concatenates the native code fragments (e.g. functions) into one code image for each processor, adjusting the code as needed to ensure correct execution, e.g. the actual address at which a function is placed in the code image needs to be used where functions are invoked, and the actual address where each data structure is positioned is similarly embedded in the emitted code image.

Linking native code fragments (e.g. objects or portions of libraries) together is a process well known to those skilled in the art of constructing toolchains, and existing commercially available or open source linkers can be employed, e.g. the GCC open source project supplies a linker. For more details, refer to the documentation accompanying such linkers.

The result of this processing is a single file containing the code images to be executed on processor P2 and processor P3 which in this description are cores on a single chip (e.g. microengines on a single NFP). Should the target processors actually be located on different chips, multiple files may be produced.

The compilation process described above is typically performed on the software developer's workstation. It may also be performed on the host server, i.e. processor P1 in FIG. 2.

The executable (binary) code resulting from compilation is then moved to a non-volatile form of memory (e.g. magnetic hard disk drive or solid state disk) attached to the host (server) in which the processors are located, i.e. in a file accessible to processor P1 in FIG. 2.

The executable code is loaded into the code store of processors P2 and P3 by writing each instruction into the appropriate location in said code store. This is performed by issuing write operations over the PCIe bus linking processors P1 and P2/P3, or by packing a number of instructions into a control message which is transported over the PCIe bus from processor P1 to an agent running on one of the cores in the same chip as processors P2/P3, e.g. one of the microengines or an ARM core. The agent unpacks the instructions and proceeds to write them into the code store.

Once the executable code has been loaded, execution commences by processor P1 or the agent running on the same chip as processors P2/P3 writing to a control register to enable processors P2 and P3 to start executing.

In one specific example of the method 50 of FIG. 4, code is to be written and compiled and loaded into the NFP integrated circuit 26 so that the loaded code can be executed by a single processor device. In this specific example, the processor device is processor and associated memory within the NFP integrated circuit 26. Some of the code is written in a high-level network processing language (HLNPL) whereas another part of the code is written as a patch or plug-in in a low-level general purpose language (LLGPL). More particularly, Program 1 51 of FIG. 4 is an amount of HLNPL code. In this specific example, the amount of HLNPL code is an amount of P4 code. The P4 programming language is an example of a high-level network processing language (HLNPL). Program 2 57, on the other hand, is an amount of LLGPL code. In this specific example, the amount of LLGPL code is an amount of C code. The C programming language is an example of a low-level general purpose language (LLGPL).

The amount of P4 code 51 is received into a novel P4 compiler. The novel P4 compiler compiles the amount of P4 code 51, thereby outputting both a first amount of native code 55 as well as a first amount of C code 56. Subsequent execution of the first amount of native code 55 by the processor device results in the generation of certain data by the processor device and the storage of the generated data in the processor device. In one example, the generated data is stored in a particular part of memory, and the first amount of C code 56 provides access to that generated data. FIG. 6 illustrates an example of the first amount of C code 56 that provides access to the generated data. This is C code that defines a function. The generated data is stored at memory location 0x23400. A call of this defined function returns the content of the memory location 0x23400. In this example, execution of the first amount of native code 55 by the processor device results in the processor device performing parsing on an incoming network packet. This incoming network packet is received as part of the incoming packet traffic on the arrow labeled 27 in FIG. 2. The result of the parsing of the incoming packet is the identifying of the IP source address of the packet, and the writing of the IP source address into memory location 0x23400. The novel P4 compiler outputs both the first amount of native code 55 as well as the associated first amount of C code 56.

A second amount of C code 57 is supplied to a C compiler along with the first amount of C code 56, and the two amounts of C code are compiled together in step 58 of FIG. 4, thereby causing the C compiler to output a second amount of native code 61. The second amount of C code 57 that is supplied to the C compiler contains a function call to the function defined by the first amount of C code 56. FIG. 7 sets forth the function call to call the function defined by the code of FIG. 6. The second amount of C code 57 also specifies a processing operation. In this example, the processing operation is a packet matching operation that uses an IP source address as its input data. The result of the packet matching operation is an indication of an action to take with respect to the packet. For example, if the IP source address is in a first address range, then the NFP integrated circuit 26 is to take the action of outputting the packet from a first port, whereas if the IP source address is in a second address range, then the NFP integrated circuit 26 is to take the action of outputting the packet from a second port. Execution of the second amount of native code 61 by the processor device causes the function to be called, and in this way the executing Program 2 receives access to the IP source address that was placed into memory location 0x23400 by virtue of the execution of the first amount of native code 55.

In this way, both the P4 language and the C language are usable to program the overall parsing and matching and action functions of the processor device within the NFP integrated circuit 26. A user of the system (a person) typically writes both the P4 code 51 as well as the C code 57. The P4 language is used to code as much of the overall program as possible, but due to the high-level nature of the P4 language it is not usable to specify certain desired low-level operations and functions. The C programming language is therefore used where necessary to specify these low-level operations and functions that cannot be specified by the high-level P4 language. Parts of the overall program originally written in the P4 programming language communicate their output data to the parts of the overall program originally written in the C programming language by virtue of the function definition of FIG. 6 and the function call of FIG. 7. The native code of both the first amount of native code 55 and the second amount of native code 61 in this particular example is made up of instructions in the instruction set of the MicroEngine (ME) processors in the NFP integrated circuit 26. In this particular example, both the first and second amounts of native code 55 and 61 are executed by the same processor device.

The novel P4 compiler automatically outputs a set of C code definitions of functions. Each of these functions is of a type that when called it returns a type of data that is of notable and common utility in network packet processing programming of NFP integrated circuits. The function of FIG. 6 that returns the IP source address obtained by parsing an incoming packet is one example of a function of this type. The C code program 57 need not call every one of these functions.

The method 50 of FIG. 4 is performed by a computer system, such as the work station 2 of FIG. 1. The processor device, on the other hand, is a part of the NFP integrated circuit 26 and is not part of the computer system. The user (a person) may write the C code 57 as a type of patch or plug-in to augment a larger program 51 written in the P4 programming language. After the user has used the computer system and has caused the computer system to generate the first amount of native code 55 and the second amount of native code 61, then the first and second amounts of native code are transferred from the computer system and into the processor device. The first and second amounts of native code may, for example, be transferred in the form of the combined native code program 63. The first and second amounts of native code are then loaded into the proper places in memory of the processor device so that the processor of the processor device can then execute that code. In another example, the first amount of native code 55 involves instructions of a first instruction set and is executed by a first processor, and the second amount of native code 61 involves instructions of a second instruction set and is executed by a second processor, and the two instruction sets are different. In yet another example, the first amount of native code 55 is loaded into and is executed by a first processor, and the second amount of native code 61 is loaded into and is executed by a second processor, but the first and second processors are two instances of the same type of processor so that the two processor execute instructions of the same instruction set.

This application claims priority under 35 U.S.C. § 119 from U.S. Provisional Application No. 62/171,230, entitled "Low-Level Programming Language Plugin to Augment High-Level Programming Language Setup of an SDN Switch," filed on Jun. 4, 2015; the subject matter of which is incorporated herein by reference.

The ASCII text file appendix of this patent document sets forth a specific embodiment of the novel P4 compiler that corresponds to 51-55 of FIG. 4. The novel P4 compiler receives and compiles a first amount of high-level programming language code (P4 code) 51. The novel P4 compiler generates and outputs a first amount of native code 55 and a first amount of low-level programming language code (C code) 56. Below are set forth descriptions of source code in files of the ASCII text file appendix.

The file "p4_hlir/hlir/p4_parser.py" within the "p4_hlir.txt" attachment: This source code is part of the P4 HLIR frontend compiler that performs parsing of the P4 source structure. It will parse any primitive_action declaration in the P4 source, such as "primitive_action my_primitive( );". This is parsed and will create an object of type P4PrimitiveAction which will be processed later.

The file "p4_hlir/frontend/dumper.py" within the "p4_hlir.txt" attachment: This file creates objects which are used by whatever tool uses the compilation result. Previously parsed P4PrimitiveAction objects will be translated into P4 action objects which are then treated as regular primitive actions but are given a custom action property.

The file "p42air/actions.py" within the "p42air.txt" attachment: This source code forms part of the p42air tool which generates a textual IR from the P4 HLIR compiler frontend result. The IR is then consumed by the Netronome backend in the next stage of the build. In this file we note any custom action primitive from the HLIR and add them to the text IR as external functions.

The file "nfp_pif_gen/action.py" within the "nfp_pif_gen.txt" attachment: This python file forms part of the Netronome backend which consumes the text based IR and generates C code to be compiled, linked and run on the NFP hardware. It generates all C code that corresponds to P4 actions. If an external primitive/function has been declared in the textual IR, this file will generate a C function call which is then called when the P4 action containing the external primitive is executed.

The file "nfp_pif_gen/callback_api.py" within the "nfp_pif_gen.txt" attachment: This file generates C files that are used for the external primitive/action C function to access memory structures that are used by the P4 dataplane. Using these, the custom C function can read from and write to any P4 headers or metadata, as well as packet control metadata.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   (a) compiling a section of high-level programming language code (HLL code) thereby obtaining a first section of native code and a first section of low-level programming language code (LLL code);
   (b) compiling a second section of LLL code along with the first section of LLL code obtained in (a) thereby obtaining a second section of native code, wherein the section of HLL code at least in part defines how a network switch performs a matching in a first condition, and wherein the second section of LLL code at least in part defines how the network switch performs matching in a second condition;
   (c) loading the first section of native code into the network switch such that a first processor of the network switch can execute at least part of the first section of native code; and (d) loading the second section of native code into the network switch such that a second processor of the network switch can execute at least part of the second section of native code.

2. The method of claim 1, wherein the matching specified by the second section of LLL code cannot be specified using the high-level programming language, wherein the section of HLL code is an amount of P4 code, wherein the first section of LLL code is an section of C code, wherein the second section of LLL code is an section of C code, wherein the first section of native code is machine code that is executable by the first processor, and wherein the second section of native code is machine code that is executable by the second processor.

3. The method of claim 1, wherein the first processor is a first processor of a Network Flow Processor (NFP) integrated circuit, and wherein the second processor is a second processor of the NFP integrated circuit.

4. The method of claim 1, wherein the network switch comprises a host computer and a Network Interface Device (NID), wherein the first processor is a processor of the host computer, and wherein the second processor is a processor of a Network Flow Processor (NFP) integrated circuit of the NID.

5. The method of claim 1, wherein the first section of LLL code is an section of C code that defines a function, wherein the function when called returns data that is generated upon execution of the first section of native code by the first processor, and wherein the section amount of LLL code is a section of C code that includes a function call of the function.

6. A method comprising:
(a) compiling a section of high-level programming language code (HLL code) thereby obtaining a first section of native code and a first section of low-level programming language code (LLL code);
(b) compiling a second section of LLL code along with the first section of LLL code obtained in (a) thereby obtaining a second section of native code, wherein the section of HLL code at least in part defines how a network switch performs a first packet parsing operation, and wherein the second section of LLL code at least in part defines how the network switch performs a second packet parsing operation;
(c) loading the first section of native code into the network switch such that a first processor of the network switch can execute at least part of the first section of native code; and
(d) loading the second section of native code into the network switch such that a second processor of the network switch can execute at least part of the second section of native code.

7. The method of claim 6, wherein the second packet parsing operation specified by the second section of LLL code cannot be specified using the high-level programming language, wherein the first amount section of LLL code is a section t of C code that defines a function, wherein the function when called returns data that is generated upon execution of the first section of native code by the first processor, and wherein the second section of LLL code is an section of C code that includes a function call of the function.

8. The method of claim 6, wherein the first processor is a first processor of a Network Flow Processor (NFP) integrated circuit, and wherein the second processor is a second processor of the NFP integrated circuit.

9. The method of claim 6, wherein the network switch comprises a host computer and a Network Interface Device (NID), wherein the first processor is a processor of a Network Flow Processor (NFP) integrated circuit of the NID, and the second processor is a processor of the host computer.

10. A method comprising:
(a) receiving a section of high-level network processing language code (HLNPL code) into a high-level network processing language code compiler (HLNPL compiler);
(b) compiling the section of HLNPL code and thereby causing the HLNPL compiler to output both a first section of low-level general purpose language code (LLGPL code) and a first section of native code, wherein subsequent execution of the first section of native code by a processor device results in the generation of data by the processor device and the storage of the generated data in the processor device, and wherein the first section of LLGPL code provides access to the generated data as the generated data is stored in the processor device;
(c) receiving the first section of LLGPL code along with a second section of LLGPL code into a low-level general purpose language compiler (LLGPL compiler), wherein the second section of LLGPL code specifies a network packet processing operation; and
(d) compiling the first and second sections of LLGPL code and thereby causing the LLGPL compiler to output a second section of native code, wherein subsequent execution of the second section of native code by the processor device causes the processor device to access the generated data as stored in the processor device and to use the generated data as input data in carrying out the network packet processing operation specified by the second section of LLGPL code.

11. The method of claim 10, wherein the high-level network processing language is the P4 programming language, and wherein the low-level general purpose language is the C programming language.

12. The method of claim 11, wherein the first section of LLGPL that is output by the HLNPL compiler in (b) includes a section of C programming language code that defines a function, and wherein the second section of LLGPL code that is received into the LLGPL compiler in (c) includes a function call to call the function defined by the section of C programming language code.

13. The method of claim 10, wherein the first amount of LLGPL code provides access to the generated data by including LLGPL code for a function, and wherein the function can be called by a function call in the low-level general purpose language.

14. The method of claim 10, wherein the data of (b) is data that is generated in a packet parsing operation, wherein execution of the first section of native code by the processor device causes the processor device to perform the packet parsing operation, and wherein the data of (b) is generated after (a) through (d) have been performed.

15. The method of claim 10, wherein the data of (b) is data that is generated in a packet matching operation, wherein execution of the first section of native code by the processor device causes the processor device to perform the packet matching operation, and wherein the data of (b) is generated after (a) through (d) have been performed.

16. The method of claim 10, wherein the data of (b) is data that is generated in carrying out an action, wherein the action is carried out as a result of a successful packet matching operation, wherein execution of the first section of native code by the processor device causes the processor device to perform the action, and wherein the data of (b) is generated after (a) through (d) have been performed.

17. The method of claim 10, wherein (a) through (d) are performed by a computer system, wherein the processor device is not a part of the computer system, and wherein the first and second sections of native code are transferred from the computer system to the processor device after (a) through (d) have been performed.

18. The method of claim 10, wherein the receiving of (a) and the compiling of (b) are performed by a computer system, and wherein the high-level network processing language code compiler is executing on the computer system.

19. The method of claim 10, wherein the processor device is a Network Flow Processor (NFP) integrated circuit that comprises a plurality of processors.

* * * * *